Dec. 21, 1926.  1,611,255
T. J. STURTEVANT
SEPARATOR
Filed Jan. 23, 1926  3 Sheets-Sheet 1

Inventor:
Thomas J. Sturtevant,
by Henry T. Williams
Atty.

Dec. 21, 1926. 1,611,255
T. J. STURTEVANT
SEPARATOR
Filed Jan. 23, 1926 3 Sheets-Sheet 3

Inventor:
Thomas J. Sturtevant,
by Henry T. Williams, atty.

Patented Dec. 21, 1926.

1,611,255

UNITED STATES PATENT OFFICE.

THOMAS J. STURTEVANT, OF WELLESLEY, MASSACHUSETTS, ASSIGNOR TO STURTEVANT MILL COMPANY, OF BOSTON, MASSACHUSETTS, A CORPORATION OF MASSACHUSETTS.

SEPARATOR.

Application filed January 23, 1926. Serial No. 83,224.

The invention to be hereinafter described relates to separators for grading materials.

In my copending application Serial No. 10,163, filed February 19, 1925, is disclosed a separator comprising screen clothing suspended between spring-pressed rods at one end of the screen and an eccentric mechanism at the opposite end of the screen, the construction being such that the screen clothing is maintained in taut condition and is reciprocated or vibrated in the direction of the plane thereof by the cooperative action of the spring-pressed rods and the eccentric mechanism. This has been found to be a good form of construction for certain purposes, and especially where the screen clothing is not called upon to support heavy loads, since it is desirable to avoid placing too much weight on the eccentric mechanism.

One of the purposes of the present invention is to provide a separator of the general type disclosed in my above mentioned application, but so constructed that the eccentric mechanism is relieved to some extent from the burden of sharing in the support of the screen clothing and the materials thereon. In carrying this feature of the invention into practical effect, in the present instance, the screen clothing is suspended between springs which are connected to opposite ends of the screen clothing and exert a pull in opposite directions, thereby to hold the screen clothing taut and in floating condition. The eccentric mechanism may be connected to one end of the screen clothing, and the springs may be arranged to provide a differential tension which will be sufficient to urge the eccentric strap or follower toward the eccentric so as to prevent lost motion. The construction is such that the screen clothing may support heavy loads, and since the eccentric mechanism bears less of the burden of contributing to the support of the screen clothing and the materials thereon, less power is required in driving the eccentric mechanism, wear thereon is reduced, the life thereof is desirably prolonged, and efficient vibration of the screen clothing is accomplished.

With the aforesaid and other purposes in view, the character of the invention may be best understood by reference to the following description of one good form thereof shown in the accompanying drawings, wherein.

Figure 1:
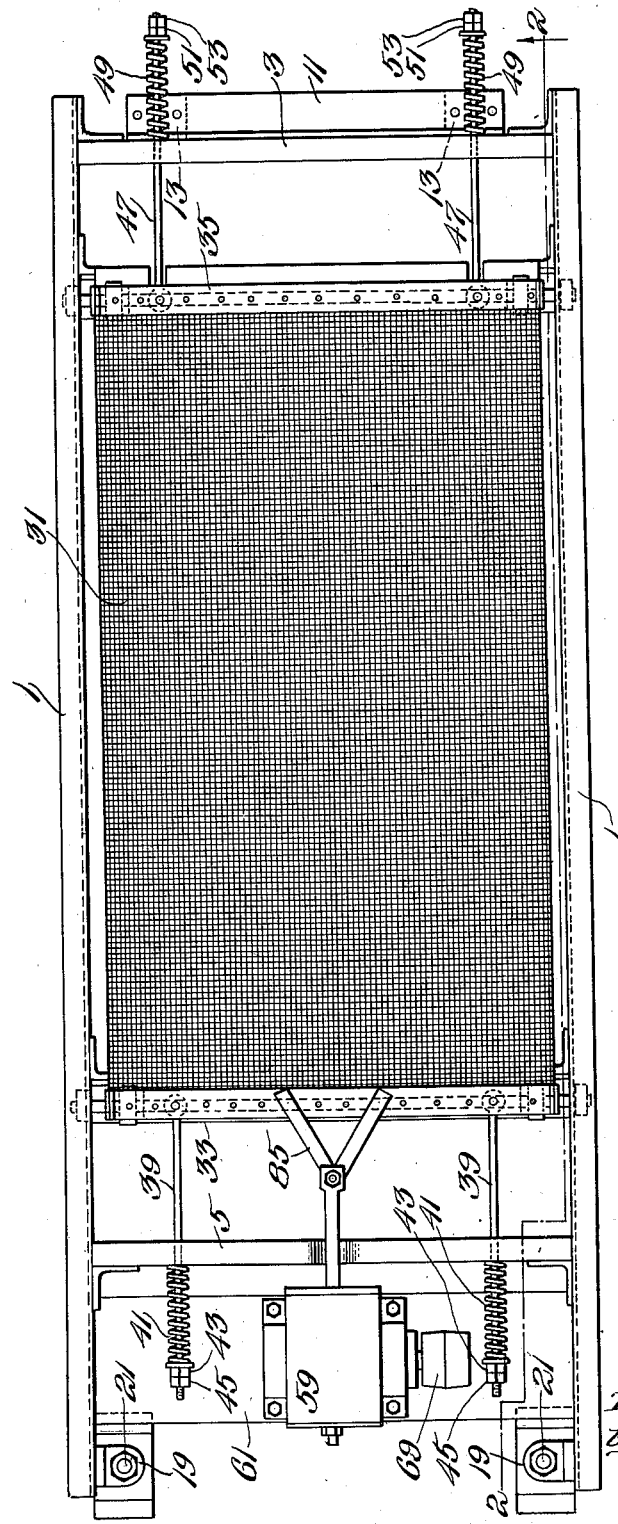
Fig. 1 is a plan of a separator embodying the invention.
Figure 2:
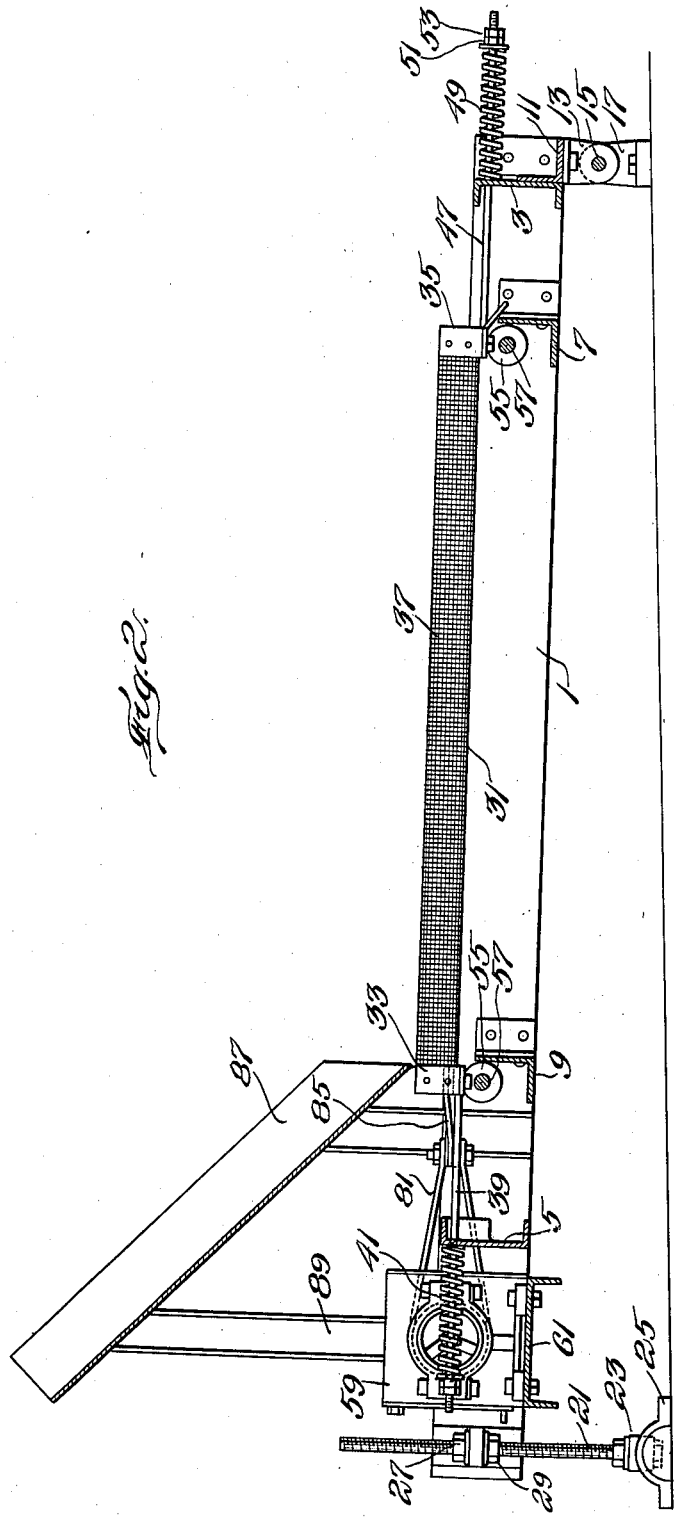
Fig. 2 is a vertical section taken on line 2—2 of Fig. 1.

Referring to the drawings, the separator shown therein as one good form of the invention, may have a suitable support, in the present instance comprising a frame having side channels 1 (Figs. 1 and 2) connected by a channel 3 at one end thereof and connected by a channel 5 a short distance from the opposite end thereof. To contribute to the stiffness of the frame, the side channels may be connected by angle bars 7 and 9.

It is desirable that this frame may be adjusted to have different inclinations. To accomplish this, the end channel 3 may have an angle bar 11 secured thereto provided with a pair of ears 13 depending therefrom and connected by a shaft 15 with a pair of feet 17, said ears being adapted to rock on the shaft. At the opposite end of the frame and secured to the side channels are eyes 19 through which extend threaded posts 21 having heads 23 at the lower ends thereof mounted on feet 25. Nuts 27 and 29 are threaded on the posts at opposite sides of the eyes 19 and are adapted to be adjusted along the posts to support the frame in different positions of angular adjustment. The heads of the posts have curved slots therein cooperating with the feet 25 to allow the posts to rock somewhat on the feet in the course of variation of the inclination of the frame. The construction is such that the frame may be adjusted so that it inclines downward or upward toward the right of Fig. 2.

The separator may be provided with a suitable screen, in the present instance, comprising woven wire screen clothing 31 having opposite end margins between and secured to bars 33 and 35, the ends of said bars and the side margins 37 of the screen clothing being bent upward to prevent materials from escaping from the side edges of the screen clothing.

It will be observed that there are no frame members connecting the end bars 33 and 35, and therefore, the screen clothing may be stretched by exerting a pull on the end bars in opposite directions away from each other. To tension the screen clothing and support the same on the frame described, rods 39 are connected to the end bars 33 and are entered through holes in the back of the channel 5 referred to, with portions extending a substantial distance out beyond said channel. Coil springs 41 encircle the rods and are confined between the channel and adjusting nuts 43 adapted to be secured in different positions of adjustment by lock nuts 45. Rods 47 are connected to the end bars 35 and are entered through holes in the back of the channel 3 and have portions extending out a substantial distance beyond the channel. Coil springs 49 encircle the rods and are confined between the channel 3 and adjusting nuts 51 adapted to be secured in different positions of adjustment by lock nuts 53. The construction is such that the screen clothing 31 is suspended and stretched between the spring-pressed rods 39 and 47. Under certain conditions it may be desirable to provide rollers 55 beneath the end bars 33 and 35, said rollers being mounted on shafts 57 carried by the side channels of the frame. However, said rollers are not indispensable.

Figure 3:
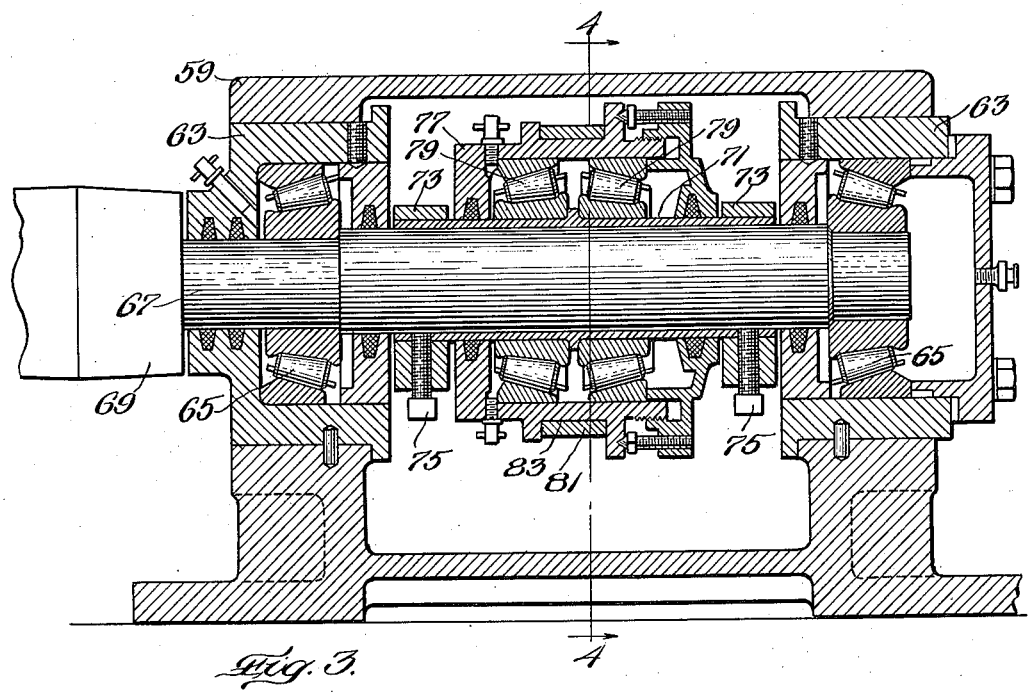
Fig. 3 is a vertical section on an enlarged scale through the eccentric mechanism.

The eccentric mechanism referred to, comprises a casing 59 mounted on and secured to a channel 61 bridging and secured to the side channels of the frame, said casing being provided with a pair of boxes 63 (Fig. 3) containing Timken roller bearings in which is journalled a shaft 67 provided with a pulley 69 adapted to be driven from any suitable source of power.

Figure 4:
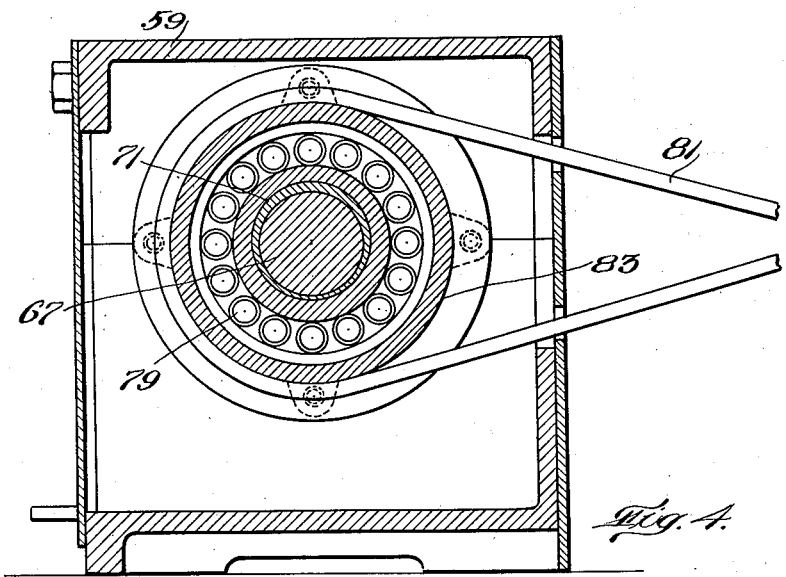
Fig. 4 is a vertical transverse section taken on line 4—4 of Fig. 3.

Mounted on the shaft 67 within the casing 59 is an eccentric sleeve 71 (Figs. 3 and 4), in the illustrated embodiment of the invention having slight eccentricity. Encircling said sleeve are a pair of rings 73, said sleeve and rings being secured to the shaft by screw bolts 75. A cylindrical box 77 is mounted on the eccentric sleeve 71, and Timken roller bearings 79 are provided between the sleeve and box. A strap 81 partially embraces a groove 83 on the box, and extends outward through the casing 59 and is connected by a bridle 85 with the end bars 33 of the screen. The eccentric mechanism may be the same as that disclosed in my application above referred to, and therefore, it is unnecessary to describe the same in further detail herein. Suitable means may be provided for conducting the materials to be graded to the screen, and in the present instance, is in the form of a chute 87 (Fig. 2) on uprights 89 carried by the frame.

The screen clothing is supported by the spring-pressed rods in floating condition between the transverse channels or bars 3 and 5. The eccentric operates through the strap to shift the screen toward the left (Figs. 1 and 2), and the springs 49 are adjusted to have a tension greater than the springs 41, thereby to shift the screen toward the right, and the differential tension will also serve to hold the strap in the bottom of the box groove 83 and prevent lost motion between parts of the eccentric mechanism. The eccentric may be driven at suitable speed and may cooperate with the springs to reciprocate or vibrate the screen in the direction of the plane thereof and with an amplitude of movement corresponding to the eccentricity of the eccentric. The springs 41 exerting a pull in opposition to that of the springs 49, will relieve the eccentric mechanism to some extent from the burden of contributing to the support of the screen clothing and the materials thereon, and by proper differential adjustment of the springs at opposite ends of the screen, the wear on the eccentric mechanism is reduced to a minimum, and the life thereof is desirably prolonged.

The springs at opposite ends of the screen are arranged so that their differential or resultant tension is sufficient always to hold the eccentric strap against the eccentric, and said tension must never be relaxed during operation sufficiently to allow jumping of the eccentric strap 81 against the bottom of the groove in the eccentric box 77. The weight of materials on the screen is substantial and may be 500 lbs. or more. The combined weight of the materials on the screen, the screen, the rods and eccentric strap has an inertia which must be overcome by the differential or resultant tension of the two sets of springs at opposite ends of the screen each time said resultant tension changes the direction of the movement of the screen in the reciprocation thereof. The resultant tension also must be sufficient to prevent sagging of the screen under its load, and must always maintain the screen in taut condition. If the differential tension of the springs should be employed merely in taking up slack in the screen, it would not be effective in contributing to the necessary reciprocatory motion of the screen. The consequence is that the differential tension or pull of the two sets of springs must be very substantial and must be resisted by the eccentric mechanism, and therefore, said mechanism is called upon to bear a very substantial share in the work of supporting the screen, but the burden on the eccentric mechanism is not so great as where only one set of springs is employed at the end of the screen opposite that to which the eccentric is connected.

It will be understood that the invention is not limited to the specific embodiment shown, and that various deviations may be made therefrom without departing from the spirit and scope of the appended claims.

What is claimed is:—

1. A separator for grading materials comprising, in combination, an eccentric mechanism, spring means, unframed screen clothing suspended between and stretched by said eccentric mechanism and spring means, and spring means acting on the screen clothing in opposition to said first named spring means, thereby to reduce the burden of the eccentric mechanism in sharing the support of the screen clothing.

2. A separator for grading materials comprising, in combination, screen clothing, an eccentric mechanism and spring means connected to one end of the screen clothing, and spring means connected to the opposite end of the screen clothing, said screen clothing, being carried by said eccentric mechanism and spring means, the spring means at opposite ends of the screen clothing having a resultant tension stretching the screen clothing in opposition to the eccentric mechanism.

3. A separator for grading materials comprising, in combination, an eccentric mechanism having an eccentric and a strap, spring means, screen clothing suspended between said eccentric strap and spring means and vibrated thereby, and spring means acting on the screen clothing in opposition to said first-named spring means, thereby to reduce the burden of the eccentric mechanism in sharing the support of the screen clothing.

4. A separator for grading materials comprising, in combination, screen clothing having stiffening members connected to opposite ends thereof, an eccentric mechanism and spring means connected to one of said members, and spring means connected to the other member, said screen clothing being carried and vibrated by said eccentric mechanism and spring means, the spring means at opposite ends of the screen clothing having a resultant tension for stretching the screen clothing in opposition to the eccentric mechanism sufficiently to maintain the screen clothing in taut condition and support the load of materials on the screen clothing.

5. A separator for grading materials comprising, in combination, a support, an eccentric mechanism and spring means mounted on said support, unframed screen clothing suspended between and carried by the eccentric mechanism and spring means and vibrated thereby, and spring means on the support acting on the screen clothing in opposition to said first named spring means, thereby to reduce the burden of the eccentric mechanism in carrying the screen clothing.

6. A separator for grading materials comprising, in combination, a screen, an eccentric mechanism and spring means connected to opposite ends of the screen and carrying and vibrating the same, and means acting in opposition to said spring means for reducing the burden of the eccentric mechanism in carrying the screen.

7. A separator for grading materials comprising, in combination, a frame, a casing mounted on the frame having bearings, a shaft journalled in said bearings, an eccentric on said shaft, a strap for the eccentric, spring means on the frame, screen clothing having stiffening members at opposite ends thereof connected to said strap and spring means respectively, and spring means on the frame connected to the stiffening member to which the strap is connected, said spring means at opposite ends of the screen clothing having a resultant tension pulling in opposition to the strap and eccentric to maintain the screen clothing in taut condition, and said eccentric and the resultant tension of said spring means operating to shake the screen in the direction of the plane thereof.

8. A separator for grading materials comprising, in combination, a support, a screen, springs on the support connected to opposite ends of the screen and arranged to exert a pull on the screen in opposite directions, an eccentric, and a member extending from the eccentric to the screen, said member and screen being moved in one direction by the eccentric, and said springs having a differential tension for urging said member into cooperative relation with the eccentric and for moving said screen in a direction opposite to that produced by the eccentric.

9. A separator for grading materials comprising, in combination, unframed screen clothing, an eccentric, a member extending from the screen clothing to the eccentric, and springs at opposite ends of the screen clothing having a differential tension for urging the member into cooperative relation with the eccentric, said screen clothing being stretched between said springs.

THOMAS J. STURTEVANT.